United States Patent [19]

Zamek

[11] 4,273,917

[45] Jun. 16, 1981

[54] ACID-TERMINATED POLYESTER IMIDE WIRE ENAMELS

[75] Inventor: Otto S. Zamek, Schenectady, N.Y.

[73] Assignee: General Electric Company, Schenectady, N.Y.

[21] Appl. No.: 100,212

[22] Filed: Dec. 4, 1979

[51] Int. Cl.³ .................. C08G 63/44; C08G 69/44
[52] U.S. Cl. .................. 528/288; 260/33.2 R; 528/296; 528/300; 528/301; 528/302
[58] Field of Search ............. 528/288, 296, 300–301, 528/302; 260/33.2 R

[56] References Cited

U.S. PATENT DOCUMENTS

| | | | |
|---|---|---|---|
| 2,982,754 | 5/1961 | Sheffer et al. | 528/288 |
| 3,161,541 | 12/1964 | Holub | 528/288 |
| 3,201,276 | 8/1965 | Meyer et al. | 528/288 |
| 3,342,780 | 9/1967 | Myer et al. | 260/75 |
| 3,382,203 | 5/1968 | Rating et al. | 528/288 |
| 3,415,903 | 12/1968 | Bottger | 528/288 |
| 3,426,098 | 2/1969 | Meyer et al. | 260/841 |
| 3,493,413 | 2/1970 | Olson | 117/218 |
| 3,865,785 | 2/1975 | Pauze | 528/288 |
| 4,117,032 | 9/1978 | Kwiecinski | 528/288 |
| 4,119,605 | 10/1978 | Keating | 260/33.2 R |
| 4,119,608 | 10/1978 | Keating | 528/189 |
| 4,119,758 | 10/1978 | Keating | 428/379 |
| 4,121,266 | 10/1978 | Kovacs et al. | 528/288 |
| 4,195,159 | 3/1980 | Kwiecinski | 528/288 |

FOREIGN PATENT DOCUMENTS 973377 10/1964 United Kingdom .

*Primary Examiner*—Lucille M. Phynes
*Attorney, Agent, or Firm*—Morgan, Finnegan, Pine, Foley and Lee

[57] ABSTRACT

Wire enamels comprise acid-terminated polyester imides prepared to an acid number of not less than 6 in the presence of a monoether or monoester of a glycol or polyglycol and dissolved in a solvent comprising predominantly a polar oxygenated compound selected from a monoether or monoester of an alkylene, or polyalkylene, glycol. Such enamels provide insulation coatings on electrical conductors which have superior flexibility, especially after aging.

8 Claims, No Drawings

ACID-TERMINATED POLYESTER IMIDE WIRE ENAMELS

This invention relates to acid-terminated polyester imide wire enamels and to electrical conductors coated therewith. More particularly, it is concerned with acid terminated ester imides prepared in the presence of a monoether or monoester of a glycol, or polyglycol and thereafter dissolved in a nonphenolic solvent which is predominantly polar and oxygenated.

BACKGROUND OF THE INVENTION

British Pat. No. 973,377 discloses a family of ester imide resins made by reacting together at least one polybasic acid or a functional derivative thereof, and at least one polyhydric alcohol or functional derivative thereof, at least one of the reactants having at least one five-membered imide ring between the functional groups of the molecule. It further discloses that the reactants can be heated in a commercial cresol mixture, then further diluted in a mixture of naphtha and cresol and used as an enamel for coating copper wire to produce a hard, thermally resistant insulation therefor. U.S. Pat. No. 3,426,098 describes ester imide resins in which all or part of the polyhydric alcohol comprises tris(2-hydroxyethyl)isocyanurate.

Okada, Japanese Pat. No. 51-16342 (published Feb. 9, 1976) prepares wire enamels by reacting polyester ingredients to a low molecular weight, then dissolving them in a monoether of a polyalkylene glycol. Ito, Japanese patent publication No. 49-59478 (published Dec. 3, 1975) makes wire enamels by heating polyester ingredients to a molecular weight just before ultimate solubility is lost, then dissolves them in a glycol ether solvent.

Keating, U.S. Pat. Nos. 4,119,605, 4,119,608; and 4,119,758, incorporated herein by reference, discloses low molecular weight polyester-imide resins which are soluble in nonphenolic solvents by incorporating a monoether of a diethylene glycol or a triethylene glycol into the resin. This differs from the Japanese disclosure because the glycol ether is used as a reactant. Keating states that the use of the monoether of a glycol as a reactant serves to control the molecular weight and solubility of the polymer and permits the manufacture of wire enamels which contain relatively non-toxic solvents in place of phenols and also permits the attainment of enamels having economical high solids contents. All of these wire enamels are prepared under conditions in which the formation of the polyester or polyester imide is substantially complete, as shown by the cessation of distillation of reactive by-products. Keating states that the acid number of his products is usually below 6. In all of the working examples, the low acid numbers and distillation under vacuum as a last step before adding solvent indicate that there are no terminal acid groups in such polyesters or polyester imides. The foregoing patents and publications are incorporated herein by reference.

It has now ben discovered that if acid-terminated polyester imide resins are prepared by heating in the presence of a monoether or monoester of a glycol or a polyglycol and the heating is stopped before all volatiles have distilled off and the acid number is still 6 or above, the acid-terminated polyester imide can then be dissolved in a solvent comprising predominantly the same, or different, polar organic monoethers or monoesters of alkylene glycols or polyalkylene glycols to produce superior wire enamels in terms of flexibility retention on aging. If the reaction is taken to low acid numbers—as required in the prior art, flexibility retention suffers, as will be shown hereafter.

DESCRIPTION OF THE INVENTION

According to the present invention, there are provided electrical wire enamels comprising
an acid-terminated polyester imide obtained by heating ingredients comprising
(a) an aromatic diamine;
(b) an aromatic carboxylic anhydride containing at least one additional carboxylic group;
(c) terephthalic acid or a reactive derivative thereof;
(d) a polyhydric alcohol having at least three hydroxyl groups;
(e) an alkylene glycol; and
(f)
 (i) an alkylene glycol monoether or monoester;
 (ii) a polyalkylene glycol monoether or monoester or
 (iii) a mixture of (i) and (ii), until an acid number of not lower than 6 to 7 is attained, discontinuing the heating, and then dissolving the acid-terminated polyester imide in a solvent therefor comprising predominantly that defined under (f) above.

Among the preferred features of the present invention are electrical wire enamels as defined above which also include an alkyl titanate; and those which also include a blocked isocyanate.

Also contemplated by the present invention are electrical conductors provided with a continuous coating of the new wire enamels, as a sole coat, or as an undercoat, or as an overcoat, and cured at elevated temperatures.

With respect to components (a)–(e) inclusive, these are conventional and well known to those skilled in this art by reason of the teachings, for example, in the above-mentioned U.K. Patent Specification No. 973,377, and U.S. Pat. No. 3,426,098.

By way of illustration, aromatic diamine component (a) can comprise benzidine, methylene dianiline, oxydianiline, diaminodiphenyl ketone, -sulfone, -sulfoxide, phenylene diamine, tolylene diamine, xylene diamine, and the like. Preferably, component (a) will comprise oxydianiline or methylenedianiline, and, especially preferably, methylenedianiline.

Illustratively, the aromatic carboxylic anhydride containing at least one additional carboxylic group component (b) can comprise pyromellitic anhydride, trimellitic anhydride, naphthalene tetracarboxylic dianhydride, benzophenone-2,3,2',3'-tetracarboxylic dianhydride, and the like. The preferred components (b) are pyromellitic anhydride or trimellitic anhydride and especially trimellitic anhydride.

Typically, terephthalic acid or a di(lower)alkyl ester ($C_1$–$C_6$) or other reactive derivative, e.g., amide, acyl halide, etc., will be used as component (c). A minor amount of the terephthalic acid can be replaced with another dicarboxylic acid or derivative, e.g., isophthalic acid, benzophenone dicarboxylic acid, adipic acid, etc. Preferably component (a) will comprise dimethyl terephthalate or terephthalic acid, and especially preferably, terephthalic acid.

As additional polyester forming ingredient (d) there will be employed a polyhydric alcohol having at least three hydroxyl groups. There can be used glycerine, pentaerythritol, 1,1,1-trimethylolpropane, sorbitol, mannitol, dipentaerythritol, tris(2-hydroxyethyl-)isocyanurate (THEIC), and the like. Preferably as component (d) there will be used glycerine or tris(2-hydroxylethyl) isocyanurate, preferably the latter.

Illustratively, the alkylene glycol component (e) will comprise ethylene glycol, 1,4-butanediol, trimethylene glycol, propylene glycol, 1,5-pentanediol, 1,4-cyclohexane dimethanol and the like. Preferably the alkylene glycol will be ethylene glycol.

The polar oxygenated reactant (f) having at least one active hydroxyl group will be selected from (i) an alkylene glycol monoether or monoester, such as ethylene glycol monomethyl ether, ethylene glycol mono-n-butyl ether, ethylene glycol monohexyl ether, ethylene glycol monoacetate, ethylene glycol monohexanoate, propylene glycol monomethyl ether, propylene glycol monoacetate, 1,4-butylene glycol mono-n-butyl ether, 1,6-hexylene glycol monomethyl ether, 2-phenoxy-2-propanol, and the like, and for (ii) a polyalkylene glycol monoether or monoester, such as diethylene glycol monoethyl ether, diethylene glycol mono-n-butyl ether, diethylene glycol monomethyl ether, diethylene glycol monoacetate, diethylene glycol monophenyl ether, triethylene glycol monoacetate, etc. Preferably, there will be used diethylene glycol monomethyl or diethylene glycol mono-n-butyl ethers or diethylene glycol monoethyl ethers. Glycols with primary or secondary hydroxyl groups can be used with similar results.

Suitable alkyl titanates include tetraisopropyl titanate, tetramethyl titanate, tetrabutyl titanate, tetrahexyltitanate, bis(acetoacetonyl)diisopropyl titanate and the like. Amounts will range from 0.2% to 1% present at the start of the reaction. Tetraisopropyl titanate is preferred.

In making the polyester imide there should normally be an excess of alcohol groups over carboxyl groups in accordance with conventional practice. The preferred ratios of ingredients, and of ester groups to imide groups, are entirely conventional, see the patents cited above, and the especially preferred ratios of ingredients will be exemplified in detail hereinafter. The acid-terminated polyester imide can be prepared in two ways, both of which will yield enamels with improved properties. In one manner of proceeding, all of the reactants are added to the vessel at the beginning of the polymerization. The reaction is carried out in the usual manner, e.g., under by-product distillation conditions, e.g., at 200° to 250° C., until the acid number drops below about 30 mg./KOH per gram, and preferably down to 6-7 then the reaction heating is discontinued and further reaction is short-stopped by adding the glycol ether or ester solvent. In another way, a two-stage reaction is conducted. First a hydroxyl rich polyester is prepared from ingredients (c), (d) and (e), and at the completion of this reaction, then ingredients (a), (b) and (f) are added and the reaction carried further under by-product distillation conditions until, the acid number again falls below 30, say down to 6-7. Heating is immediately discontinued, then the reaction is short-stopped by adding the glycol ether or ester solvent. In either case the preferred titanate can be added at the start of the reaction. The glycol ether or ester added as solvent will preferably include a minor proportion of a hydrocarbon diluent, e.g., an aromatic naphtha, such as Solvesso 100, or toluene, dodecane, and the like.

Enamels prepared by the present invention have improved properties over glycol ether, or ester, based esterimides that have been prepared via reactions taken to a higher degree of completion, as measured by complete by-product removal by distillation, very low acid number, and the like. As has been mentioned, and as will be shown hereinafter, the flexibility retention is dramatically improved.

An even greater improvement in flexibility retention is observed when blocked polyisocyanates are added. These are known additives for such wire enamels, but alkanol blocked isocyanates, of the type made available by Mobay Company, under the designation KL5-7005 are especially effective. Those can be used at 1 to 15% by weight solids, based on resin solids.

The wire enamels thus made are applied to an electrical conductor, e.g., copper, aluminum, silver or stainless steel wire, in conventional fashion. Illustratively, wire speeds of 15 to 65 feet/min. can be used with wire tower temperatures of 250° to 920° F. The build up of coating on the wire can be increased by repetitive passes through the enamel. The coatings produced from the present enamels have excellent smoothness, flex resistance, continuity, solvent resistance, heat aging, dissipation factors, cut through resistance, heat shock, abrasion resistance and dielectric strength.

When used as an undercoat the enamels of this invention are applied to the conductor as above-mentioned, and built up to the conventional thickness, e.g., with multiple passes. Then a lesser wall of a different, overcoat enamel is applied. This can be, without limitation, a polyamide-imide, e.g., the heat reaction product of trimellitic anhydride and methylene dianiline diisocyanate, or an etherimide, a polyester, a nylon, an isocyanurated polyester, an isocyanurated polyester polyamide, and the like. When used as an overcoat, the enamels of this invention are applied as a lesser wall over a conductor previously provided with an undercoat of a different enamel, such as a polyester or a polyester imide, etc. Suitable second-type enamels are shown, e.g., in Precopio et al., U.S. Pat. No. 2,936,296; Meyer et al., U.S. Pat. No. 3,342,780; Meyer et al., U.S. Pat. No. 3,426,098; George, U.S. Pat. No. 3,428,486; and Olson et al., U.S. Pat. No. 3,493,413, all of which are incorporated herein by reference to save unnecessarily detailed description.

DESCRIPTION OF THE PREFERRED EMBODIMENTS

The following examples illustrate the present invention. They are not intended to limit the scope of the claims in any manner whatsoever.

EXAMPLE 1

A wire enamel is made by charging a suitably sized flask with Part I of the following reactants:

|  | Part | Gms. |
| --- | --- | --- |
| Ethylene Glycol | I | 214.2 |
| Tris (2-hydroxyethyl) isocyanurate | I | 820.71 |
| Terephthalic acid | I | 582.53 |
| Tetraisopropyl titanate | I | 4.63 |
| Propylene glycol mono phenyl ether | II | 442.2 |
| Methylenedianiline | II | 298.08 |
| Trimellitic anhydride | II | 573.99 |

The contents are heated slowly with the evolution of water to a maximum temperature of 216° C. until the amount of distillate reaches 155.8 ml. The batch is cooled to 110° C. and Part II is added. The heating is resumed to a maximum temperature of 216° C. and the distillate (water) evolved is collected and measured. When the amount of distillate reaches 95.2 ml. The acid number is between 6 and 7. The temperature is lowered under 200° C. and the resin is diluted with 398 g. Solvesso 100 and 1194 g. diethylene glycol monomethyl ether.

Enamel solution (1400 g) is further diluted with 75 g. of diethylene glycol monomethyl ether and 25 g. of hydrocarbon solvent (Solvesso 100). To this solution is added 93 g. of a 40% solution of alkanol-blocked polyisocyanate (Mobay KL5-7005) in diethylene glycol monomethyl ether and 9.74 g. of tetraisopropyltitanate in 20 g. of diethylene glycol monomethyl ether and 15 g. of Solvesso 100. The resultant clear solution has a viscosity of 884 cs. at 25° C. and a solids content of 47.1%.

EXAMPLE 2

A flask is charged with the following:

|  | Gms. |
| --- | --- |
| Ethylene glycol | 164.9 |
| Terephthalic acid | 438.6 |
| Trimellitic anhydride | 739.7 |
| Methylene dianiline | 392.6 |
| Tris (2-hydroxyethyl) isocyanurate | 660.9 |
| Tetraisopropyl titanate | 4.5 |
| Diethylene glycol monoethyl ether | 427.0 |

The contents are heated slowly with the evolution of distillate (water) to a maximum temperature of 215° C. During this time the amount of distillate is monitored. When it reaches 247.2 ml., and an acid number of between 6 and 7, the batch is cooled below 200° C. and diluted with 459 g. of Solvesso 100 and 1378 g. of diethylene glycol monomethyl ether.

To the enamel solution (1400 g) is added 101.4 g. of a 40% solution of Mobay KL5-7005 in diethylene glycol monomethyl ether and 10.61 g. of tetraisopropyl titanate in 20 g. of diethylene glycol monomethyl ether and 10 g. of Solvesso 100. The sample is further adjusted with 30 g. of diethylene glycol monomethyl ether and 10 g. of Solvesso 100. The resultant solution has a viscosity of 820 cs. at 25° C. and a solids content of 45.32%.

EXAMPLE 3

A flask is charged with the following:

|  | Gms. |
| --- | --- |
| Ethylene glycol | 214.2 |
| Terephthalic acid | 582.53 |
| Trimellitic anhydride | 573.99 |
| Methylene dianiline | 298.08 |
| Tris (2-hydroxyethyl) isocyanurate | 820.71 |
| Tetraisopropyl titanate | 22.56 |
| Diethylene glycol monoethyl ether | 442.2 |

The contents are slowly heated with the evolution of water to a maximum temperature of 216° C. During this time the water evolved is measured. When the distillate volume reaches 261.4 ml., acid number between 6–7, the batch is cooled below 200° C. and diluted with 423 g. of Solvesso 100 and 1269 g. diethylene glycol monomethyl ether.

To the enamel solution (1400 g) is added 51.7 g. of a 40% solution of Mobay KL5-7005 in diethylene glycol monomethyl ether. The solution is further adjusted with 45 g. of diethylene glycol monomethyl ether and 15 g. of Solvesso 100. The resultant solution has a viscosity of 931 cs. at 25° C. and a solids content of 49.31%.

EXAMPLE 4

A flask is charged with Part I of the following:

|  | Part | Gms. |
| --- | --- | --- |
| Ethylene glycol | I | 164.9 |
| Terephthalic acid | I | 438.6 |
| Tris (2-hydroxyethyl) isocyanurate | I | 660.9 |
| Tetraisopropyl titanate | I | 21.63 |
| Diethylene glycol monoethyl ether | II | 427.0 |
| Methylenedianiline | II | 392.6 |
| Trimellitic anhydride | II | 739.7 |

The contents are heated slowly with the evolution of water to a maximum temperature of 218° C. until a clear resin is obtained, and the amount of distillate reaches 120 ml. The batch is cooled to 140° C. and Part II is added. The heating is resumed to a maximum temperature of 214° C. During this time the volume of distillate is monitored. When the distillate collected reaches 143.1 ml. and the acid number falls to between 6 and 7, the batch is cooled below 200° C. and diluted with 384 g. of Solvesso 100 and 1153 g. of diethylene glycol monomethyl ether.

To the enamel solution (1350 g.) is added 52.73 g. of a 40% solution of Mobay KL5-7005 in diethylene glycol monomethyl ether. The solution is further adjusted with 105 g. of diethylene glycol monomethyl ether and 35 g. of Solvesso 100. The resultant solution has a viscosity of 931 cs. at 25° C. and a solids content of 45.27%.

EXAMPLE 5

A flask is charged with Part I of the following:

|  | Part | Gms. |
| --- | --- | --- |
| Ethylene glycol | I | 321.3 |
| Terephthalic acid | I | 873.8 |
| Tris (2-hydroxyethyl) isocyanurate | I | 1231.1 |
| Tetraisopropyl titanate | I | 33.9 |
| Diethylene glycol monomethyl ether | II | 663.3 |
| Methylenedianiline | II | 447.1 |
| Trimellitic anhydride | II | 861.0 |

The contents are slowly heated with the evolution of water to a maximum temperature of 217° C. until a distillate volume of 239.8 ml. is obtained. The batch is cooled to 150° C. and Part II is added. The heating is resumed to a maximum temperature of 204° C. During this time the distillate collected is monitored. When the distillate volume reaches 154.6 ml. and the acid number falls to between 6 and 7, the batch is cooled below 150° C. and diluted with 586 g. of diethylene glycol monomethyl ether. To hot resin solution is also added 236.7 g. of a 40% solution of Mobay KL5-7005 in diethylene glycol monomethyl ether and 364 g. of diethylene glycol monomethyl ether. The resultant solution is an extremely viscous liquid at room temperature and has a solids content of 67.72%. It is hot applied to copper wire at 80° C.

COMPARATIVE EXAMPLE

For comparative purposes a wire enamel is made by reacting to complete removal of by-products by distillation.

The following materials are reacted in a suitably-sized flask.

|  | Gms. |
| --- | --- |
| Ethylene glycol | 278.46 |
| Terephthalic acid | 757.29 |
| Trimellitic anhydride | 746.19 |
| Methylene dianiline | 387.50 |
| Tris (2-hydroxyethyl) isocyanurate | 1066.92 |
| Tetraisopropyl titanate | 6.02 |
| Diethylene glycol mono-n-butyl ether | 574.86 |

The contents are heated slowly with the evolution of distillate (water) to a maximum temperature of 217° C. until the amount of distillate reaches 332 ml. The acid number is ≦0.5 (mg. KOH as titrated with 0.1 m KOH). Then the resin is isolated by pouring hot onto a tray. The resin (750 g) is then dissolved in 340 g. diethylene glycol monomethyl ether and 110 g. of Solvesso 100.

To the enamel solution is added 42.31 g. of blocked isocyanate and 16.80 g. of tetraisopropyl titanate in 80 g. of diethylene glycol monomethyl ether and 20 g. of Solvesso 100. The solution is further adjusted with 80 g. of diethylene glycol monomethyl ether and 20 g. Solvesso 100. The resulting solution has a viscosity of 819 cs at 25° C. and a solids content of 47.2%.

The enamels are applied in a 15 foot vertical tower at 700° F. on 18 AWG copper magnet wire in 6 passes at 38 ft./min. to produce a coated wire. Flexibility retention is measured in a conventional way, and the results are set forth in the following Table:

TABLE

| | Flexibility of Coated Copper Wire | | | | | |
| --- | --- | --- | --- | --- | --- | --- |
| Example | Time, days | Flex* | Time, days | Flex | Time, days | Flex |
| 1 | 0 | 1x | 35 | 2X | 117 | 2X |
| 2 | 0 | 1X | 32 | 1X | 115 | 2X |
| 3 | 0 | 3X | 27 | 2X | 109 | 3X |
| 4 | 0 | 1X | 46 | 2X | 96 | 2X |
| 5 | 0 | 1X | 28 | 2X | N.D.** | — |
| Comparative | 0 | 2X | 30 | Fail 5X | — | — |

*Flexibility = 25%+
**N.D. - Not determined

The flexibility retention of the enamels produced according to this invention is seen to be outstanding.

Dual coated wires are made in a tower as described above.

In the first, a base coat of a polyester of dimethyl terephthalate, ethylene glycol and glycerine made according to Precopio et al., U.S. Pat. No. 2,936,296 is applied to a build of about 2.3 mils. To this coating is then applied a thinner, 0.3 mil. over coating of the acid-terminated polyester imide of Example 1. A coated copper conductor according to this invention is obtained.

In the second, a wire coated with the acid-terminated polyester polyimide of this invention (Example 1) has applied to it a thin outer coating of an amide-imide made by mixing and heating trimellitic anhydride and the diisocyanate of methylene dianiline. A coated copper conductor according to this invention is obtained.

It is obviously possible to make many variations in the present invention in light of the above, detailed description. For example, the alkyl titanate can be omitted. The polyisocyanate, also, can be omitted. Phenol-formaldehyde resin can be added or it can be substituted with a melamine-formaldehyde resin. Metal driers can also be added, e.g., 0.2 to 1.0% based on total solids, of zinc octoate, cadmium linoleate, calcium octoate, and the like. Instead of the monomethyl ether of diethylene glycol used as solvent, there can be used the monobutyl ether of diethylene glycol. The following monoester alcohols can be used: ethylene glycol monoacetate and diethylene glycol monoacetate. All such obvious variations are within the full intended scope of the appended claims.

I claim:

1. An electrical wire enamel comprising:
an acid-terminated polyester imide obtained by heating ingredients comprising
   (a) an aromatic diamine;
   (b) an aromatic carboxylic anhydride containing at least one additional carboxylic group;
   (c) terephthalic acid or a reactive derivative thereof;
   (d) a polyhydric alcohol having at least three hydroxyl groups;
   (e) an alkylene glycol; and
   (f)
      (i) an alkylene glycol monoether or monoester;
      (ii) a polyalkylene glycol monoether or monoester; or
      (iii) a mixture of (i) and (ii),
until an acid number of not lower than 6 to 7 is attained, discontinuing the heating, and then dissolving the acid-terminated polyester imide in a solvent therefor comprising predominantly that defined under (f) above.

2. An electrical wire enamel as defined in claim 1 which also includes an alkyl titanate.

3. An electrical wire enamel as defined in claim 1 which also includes a blocked isocyanate.

4. An electrical wire enamel comprising
an acid-terminated polyester imide obtained by heating ingredients comprising
   (a) methylene dianiline;
   (b) trimellitic anhydride;
   (c) terephthalic acid;
   (d) tris(2-hydroxyethyl)isocyanurate;
   (e) ethylene glycol; and
   (f)
      (i) diethylene glycol monoethyl ether:
      (ii) diethylene glycol monomethyl ether
      (iii) or a mixture thereof until an acid number of not lower than 6 to 7 is attained, discontinuing the heating, and then dissolving the acid-terminated polyester imide in a solvent therefor comprising predominantly that defined under (f) (ii) above.

5. An electrical wire enamel as defined in claim 4 which also includes tetraisopropyl titanate.

6. An electrical wire enamel as defined in claim 4 which also includes a blocked isocyanate.

7. An electrical conductor provided with a continuous coating of the acid-terminated polyester imide wire enamel of claim 1.

8. An electrical conductor provided with a continuous coating of the acid-terminated polyester imide wire enamel of claim 4.

* * * * *